US007296255B2

(12) United States Patent
Garms et al.

(10) Patent No.: US 7,296,255 B2
(45) Date of Patent: Nov. 13, 2007

(54) SYSTEMS FOR INCREMENTAL APPLICATION DEPLOYMENT

(75) Inventors: Jesse Michael Garms, Seattle, WA (US); Kenneth Kin-Wai Tam, Bellevue, WA (US)

(73) Assignee: Bea Systems, Inc., San Jose, CA (US)

( * ) Notice: Subject to any disclaimer, the term of this patent is extended or adjusted under 35 U.S.C. 154(b) by 434 days.

(21) Appl. No.: 10/785,853

(22) Filed: Feb. 23, 2004

(65) Prior Publication Data

US 2004/0255262 A1    Dec. 16, 2004

Related U.S. Application Data

(60) Provisional application No. 60/450,075, filed on Feb. 25, 2003.

(51) Int. Cl.
  *G06F 17/30* (2006.01)
(52) U.S. Cl. .................. 717/100; 707/205; 707/201
(58) Field of Classification Search ............... 707/205, 707/201
  See application file for complete search history.

(56) References Cited

U.S. PATENT DOCUMENTS

| 6,546,554 | B1 | 4/2003 | Schmidt |
| 6,557,100 | B1 | 4/2003 | Knutson |
| 6,766,333 | B1 * | 7/2004 | Wu et al. ................... 707/201 |
| 6,912,710 | B2 * | 6/2005 | Broussard et al. .......... 717/170 |
| 2002/0104071 | A1 | 8/2002 | Charisius et al. |
| 2003/0056207 | A1 | 3/2003 | Fischer |
| 2003/0061247 | A1 * | 3/2003 | Renaud ..................... 707/205 |
| 2003/0101245 | A1 * | 5/2003 | Srinivasan et al. ......... 709/221 |
| 2003/0101445 | A1 * | 5/2003 | Li et al. .................... 717/170 |
| 2003/0159130 | A1 | 8/2003 | Broussard et al. |
| 2003/0192031 | A1 | 10/2003 | Srinivasan |
| 2004/0158571 | A1 | 8/2004 | Kovacs et al. |

* cited by examiner

*Primary Examiner*—John Breene
*Assistant Examiner*—Dennis Myint
(74) *Attorney, Agent, or Firm*—Fliesler Meyer LLP

(57) ABSTRACT

Incremental application deployment allows any files under development for an application to be modified directly in place, such as on a server disk. Application and module configuration information can be collected from a user as they build their application. Each time a developer modifies the configuration of the application, changes can be immediately deployed to the server in the background, including appropriate modifications to the deployment descriptors. Once modifications are completed, the application can have already been deployed to the server.

This description is not intended to be a complete description of, or limit the scope of, the invention. Other features, aspects, and objects of the invention can be obtained from a review of the specification, the figures, and the claims.

12 Claims, 4 Drawing Sheets

SYSTEMS FOR INCREMENTAL APPLICATION DEPLOYMENT

CLAIM TO PRIORITY

The present application claims the benefit of priority under 35 U.S.C. §119(e) to U.S. Provisional Patent Application entitled "SYSTEMS AND METHODS FOR INCREMENTAL APPLICATION DEPLOYMENT", application Ser. No. 60/450,075, filed on Feb. 25, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the deployment of applications and application components.

BACKGROUND

Figure 1:
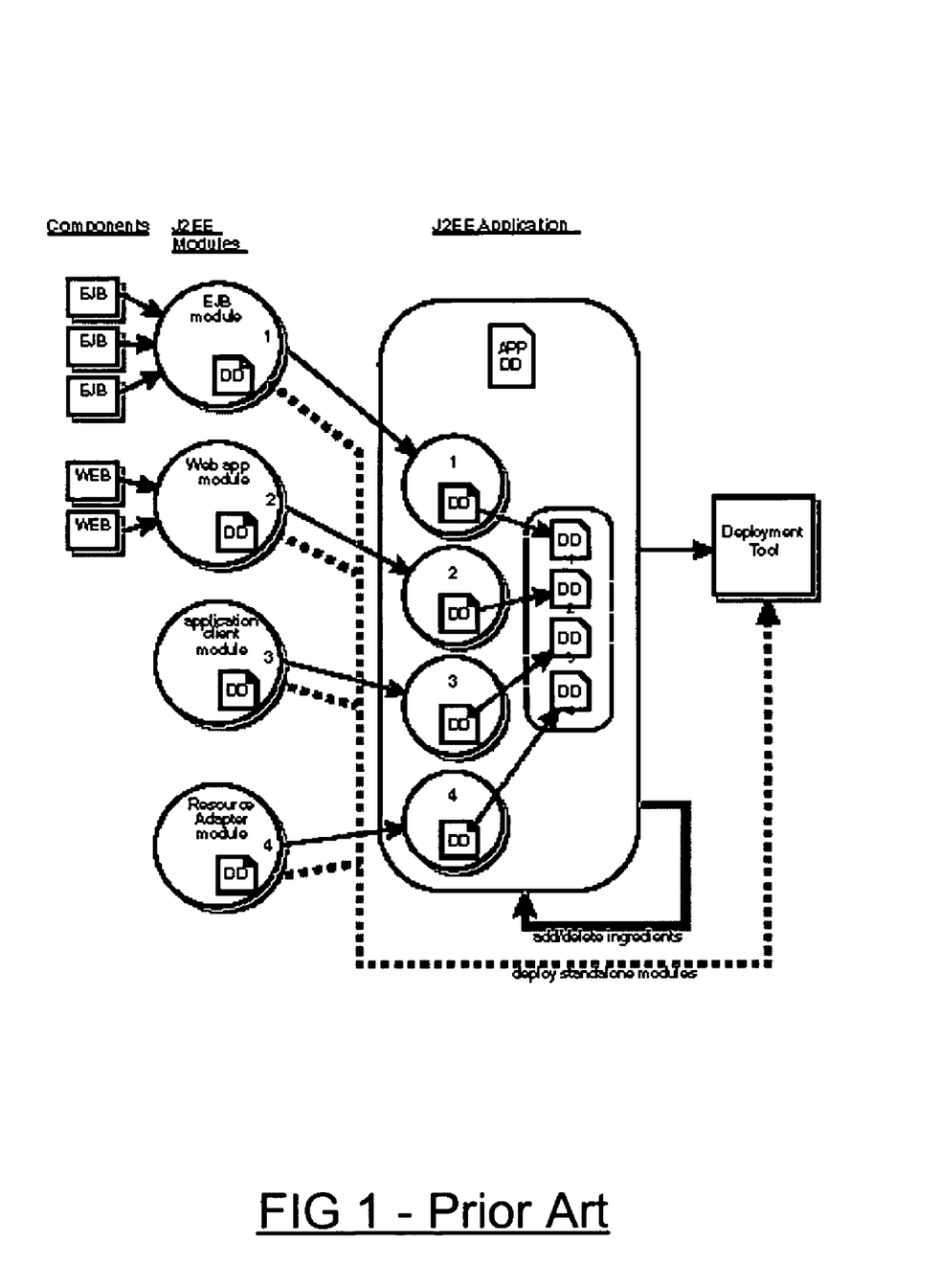
FIG. 1 is an illustration of a Java 2 Enterprise Edition Application Model in accordance with the prior art.

With software companies competing to beat one another to market with the "latest and greatest" software products and technologies, the need for reduced development cycle times is very high. Developers usually perform numerous iterations of code development, modification, deployment and testing of a design before the product can be shipped. It is often useful for the software developer to view and test the results of each incremental software change as it is completed before proceeding to the next change. However, in many software development environments, the process of rebuilding, redeploying and testing complex software projects can be tedious and time consuming. This is especially true when building large web applications that must be packaged and deployed to a server before they can be tested. For example consider the Java 2 Enterprise Edition application model depicted in FIG. 1. When a large number of iterations is required, the accumulated build and deploy time becomes significant. The resulting delays are undesirable in a market where short development times are necessary in order to remain competitive.

Deploying complex software applications involves more than just placing the files on the server. Each component and application must be configured to e.g. allocate appropriate server resources and specify security requirements. To satisfy these requirements, enterprise application servers require the creation of several deployment descriptors. These descriptors are specially formatted files that describe each of the components being deployed, their relationships, their required resources and other characteristics such as security requirements. An example of one of these deployment descriptors is shown below.

```
<Domain Name="workshop">
    <SNMPAgent Name="workshop"/>
    <ApplicationManager Name="workshop"/>
    <JTA Name="workshop" TimeoutSeconds="500"/>
```

-continued

```
    <Log FileName="./wl-domain.log" Name="workshop"/>
    <Server
        AcceptBacklog="50"
        AdministrationPort="1"
        ClusterWeight="1"
            ConsoleInputEnabled="false" DGCIdlePeriodsUntilTimeout="2"
            DefaultProtocol="t3" DefaultSecureProtocol="t3s"
            HttpdEnabled="true" ListenPort="7001" Name="cgServer"
            NativeIOEnabled="true" ServerVersion="7.0.0.0"
            SocketReaderTimeoutMaxMillis="10"
            ReliableDeliveryPolicy="RMDefaultPolicy"
            TransactionLogFilePrefix="./logs/"
            TunnelingClientPingSecs="45"
            TunnelingClientTimeoutSecs="40">
            <COM Name="cgServer"/>
            <ExecuteQueue Name="default" ThreadCount="15"/>
            <JTAMigratableTarget Cluster=""
                Name="cgServer"
                UserPreferredServer="cgServer"/>
            <KernelDebug Name="cgServer"/>
            <KernelDebug Name="workshop"/>
            <SSL Enabled="true" IdentityAndTrustLocations="KeyStores"
                ListenPort="7002" Name="cgServer"/>
            <ServerDebug Name="cgServer"/>
            <ServerStart Name="cgServer"/>
            <WebServer
                DefaultWebApp="default"
                LogFileName="./logs/access.log" LoggingEnabled="true"
                Name="cgServer"/>
    </Server>
    <JMSFileStore Directory="rmfilestore" Name="FileStore"/>
    <WSReliableDeliveryPolicy Name="RMDefaultPolicy"
Store="FileStore"
        DefaultRetryCount="10" DefaultTimeToLive="60000"/>
    <JDBCConnectionPool CapacityIncrement="1"
        DriverName="com.pointbase.jdbc.jdbcUniversalDriver"
        InitialCapacity="5" MaxCapacity="20" Name="cgPool"
        Properties="user=cajun;password=abc"
        RefreshMinutes="0" ShrinkPeriodMinutes="15"
        ShrinkingEnabled="true"
        Targets="cgServer" TestConnectionsOnRelease="false"
        SupportsLocalTransaction="true"
        TestConnectionsOnReserve="false"
        URL="jdbc:pointbase:server://localhost:9093/cajun"/>
    <JDBCTxDataSource
        Name="cgDataSource"
        JNDIName="cgDataSource"
        PoolName="cgPool"
        EnableTwoPhaseCommit="true"
        Targets="cgServer"/>
    <Application Deployed="true" Name="JWSQueueTransport"
                Path="c:/bea2/weblogic81/server/lib/"
                TwoPhase="false">
        <EJBComponent Name="QueueTransportEJB"
            Targets="cgServer"
                        URI="QueueTransportEJB.jar"/>
    </Application>
    <JMSJDBCStore
        ConnectionPool="cgPool" Name="cgJMSStore"
        PrefixName= "cajun" />
    <JMSConnectionFactory
JNDIName="weblogic.jws.jms.QueueConnectionFactory"
        Name="cgQueue" Targets="cgServer"
UserTransactionsEnabled="true"
        Notes="User transactions must be enabled to ensure transaction
coordination for persistence and asynchronous operations"/>
    <JDBCTxDataSource
        Name="cgSampleDataSource"
        JNDIName="cgSampleDataSource"
        PoolName="cgPool"
        EnableTwoPhaseCommit="true"
        Targets="cgServer"/>
    <Application Deployed="true" Name="certificate" Path="./"
TwoPhase="false">
        <WebAppComponent Name="certificate" Targets="cgServer"
                        URI="certificate.war"/>
    </Application>
    <Application Deployed="true" Name="default"
                Path="./wlw_apps/DefaultWebAppEar">
```

-continued

```
    <WebAppComponent Name="default"
    ServletReloadCheckSecs="0"
                  Targets="cgServer"
                  URI="DefaultWebApp"/>
</Application>
<Application Name="samples" Path="./wlw_apps/samplesEar"
    StagingMode="nostage" TwoPhase="true">
    <WebAppComponent Name="BusinessControls"
    Targets="cgServer"
                  URI="BusinessControls"/>
    <WebAppComponent Name="samples" Targets="cgServer"
URI="samples"/>
</Application>
<JMSServer Name="cgJMSServer" Store="cgJMSStore"
          Targets="cgServer">
    <JMSQueue JNDIName="credit.response"
          Name="credit.response"
          RedeliveryLimit="2" StoreEnabled="default"/>
    <JMSQueue JNDIName="jms.SimpleJmsQ"
          Name="jms.SimpleJmsQ"
          RedeliveryLimit="2" StoreEnabled="default"/>
    <JMSQueue JNDIName="jms.CustomJmsCtlQ"
          Name="jms.CustomJmsCtlQ"
          RedeliveryLimit="2" StoreEnabled="default"/>
    <JMSQueue JNDIName="tutorial.credit.request"
          Name="tutorial.credit.request"
          RedeliveryLimit="2" StoreEnabled="default"/>
    <JMSQueue JNDIName="credit.request"
          Name="credit.request"
          RedeliveryLimit="2" StoreEnabled="default"/>
    <JMSQueue JNDIName="jws.queue"
          Name="cgJWSQueue"
          RedeliveryLimit="2" StoreEnabled="default"/>
    <JMSTopic JNDIName="jms.AccountUpdate"
          Name="jms.AccountUpdate"
          RedeliveryLimit="2" StoreEnabled="default"/>
</JMSServer>
</Domain>
```

Developing these deployment descriptors manually is tedious and time consuming. In addition, each time the deployment configuration changes, the deployment descriptors must change to match. This process can complicate development tasks and lengthen development cycles.

SUMMARY OF THE INVENTION

Systems and methods in accordance with embodiments of the present invention can provide for, and/or utilize, incremental application deployment. Using incremental application deployment all the files under development can be modified directly in place on the server's disk. Application and module configuration information can be collected from the user as they build their application, e.g. using an Integrated Development Environment (IDE).

Each time the developer modifies the configuration of the application, changes can be immediately deployed to the server in the background, including appropriate modifications to the deployment descriptors. If the server is not running when the developer modifies the configuration of the application, the changes cannot be immediately deployed. Instead, a synchronization procedure can be initiated each time the server starts.

DETAILED DESCRIPTION

Systems and methods in accordance with embodiments of the present invention can provide for, and/or utilize, incremental application deployment. Using incremental application deployment, all the files under development can be modified directly in place on the server's disk. Application and module configuration information can be collected from the user as they build their application, e.g. using an Integrated Development Environment (IDE).

Each time the developer modifies the configuration of the application, changes can be immediately deployed to the server in the background, including appropriate modifications to the deployment descriptors. Therefore, when it comes time to test the application, the application can have already been deployed to the server.

In one embodiment o the present invention, if the server is not running when the developer modifies the configuration of the application, the changes cannot be immediately deployed. Instead, a synchronization procedure can be initiated each time the server starts. The server synchronization process can be careful not to remove or otherwise modify application specific configuration settings that may have been added manually by the developer while the server was down.

Incremental application deployment and server deployment synchronization effectly eliminate the need for a separate deployment step in the development cycle. This shortens development cycles, decreasing overall development time and time to market.

In addition, it allows developers to see the results of their software changes almost immediately. Thus, modifications can be tested more frequently allowing developers to rapidly iterate on and improve their designs. Incorrect assumptions and costly mistakes can be caught early in the process, instead of waiting for the next convenient time for a deployment (e.g., a coffee break).

Incremental application deployment and server deployment synchronization also simplify the task of the developer by eliminating the need for highly specialized knowledge about deployment descriptors. This reduces the time and cost of training new developers and reduces the skill level required to build complex web applications thereby increasing the population of developers that can be productive on a project right away.

Initiating Incremental Deployment

The incremental deployment process may be initiated any time the host environment (e.g., IDE) detects a change in application configuration. If the server where the application is to be deployed is running, the entire process may run to conclusion, deploying new modules, removing old modules and applying required changes to other modules. The result is a deployed application that is ready to run.

If however, the server is not running, the process may only partially complete, staging the rest of the process for when the server restarts. Each time the server restarts, it sends a notification and if necessary the incremental deployment process starts again and runs to completion.

Figure 2A:
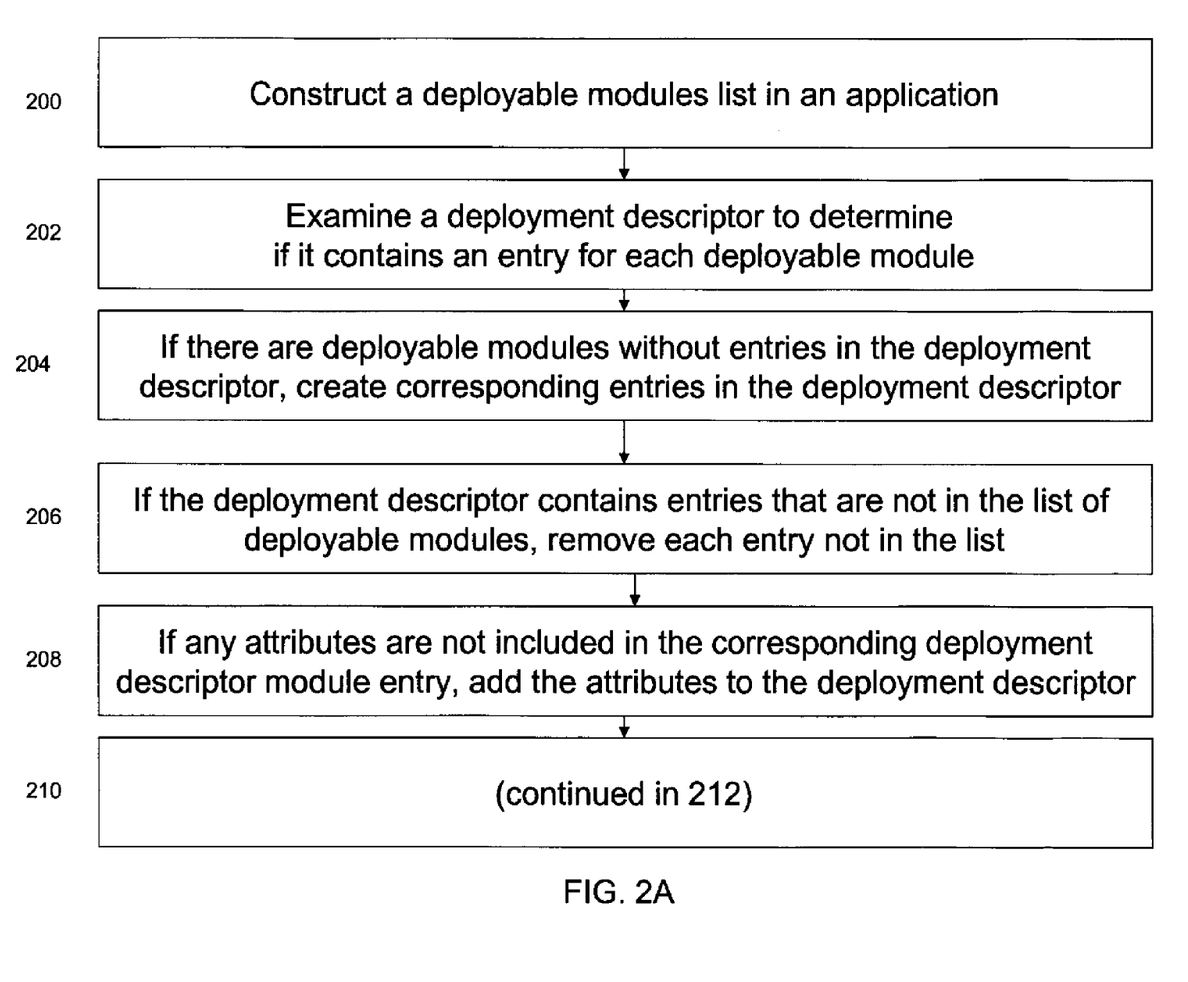
FIG. 2A, FIG. 2B, and FIG. 2C describe an incremental deployment process in accordance with one embodiment of the invention.
Figure 2B:
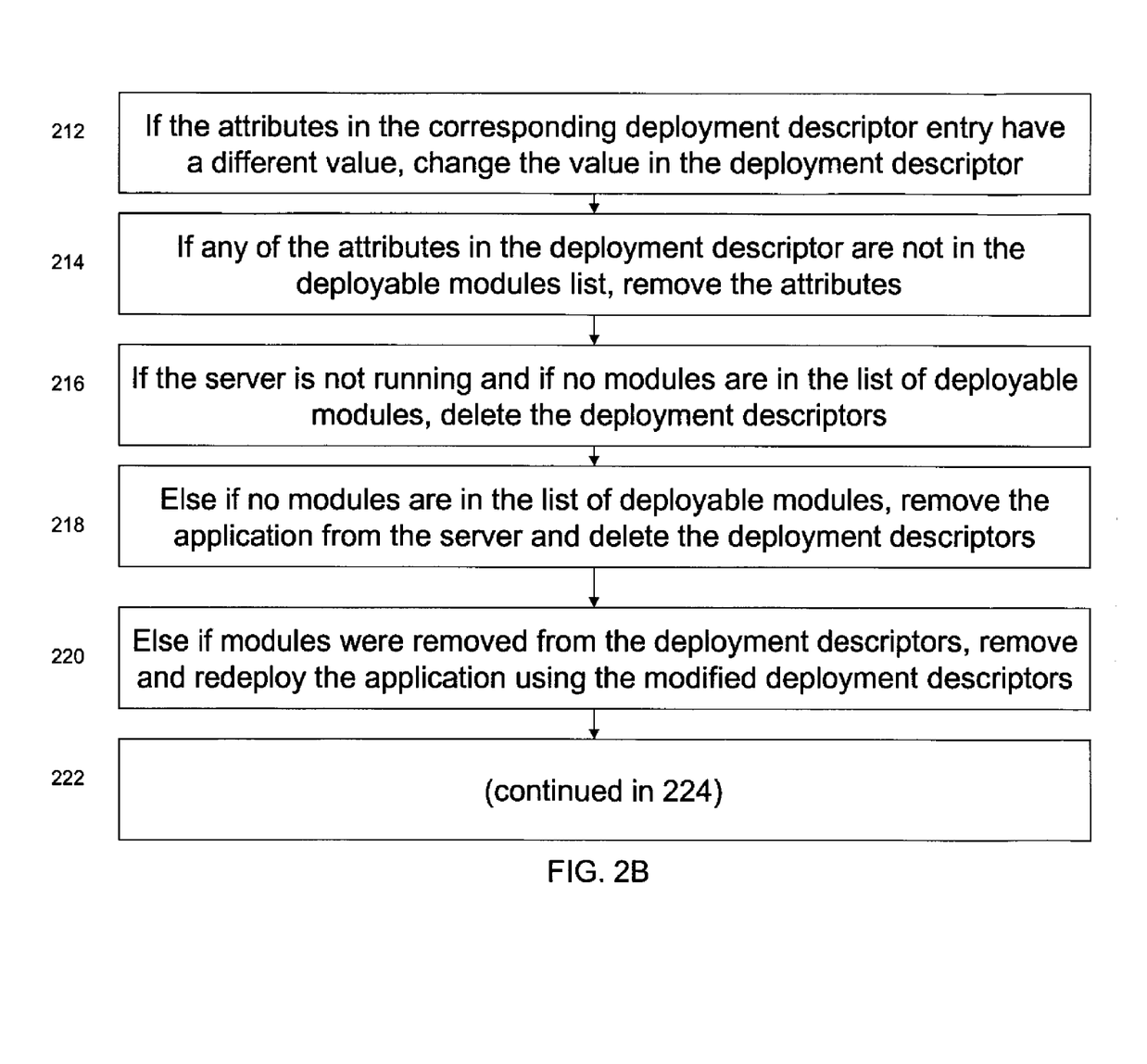
Figure 2C:
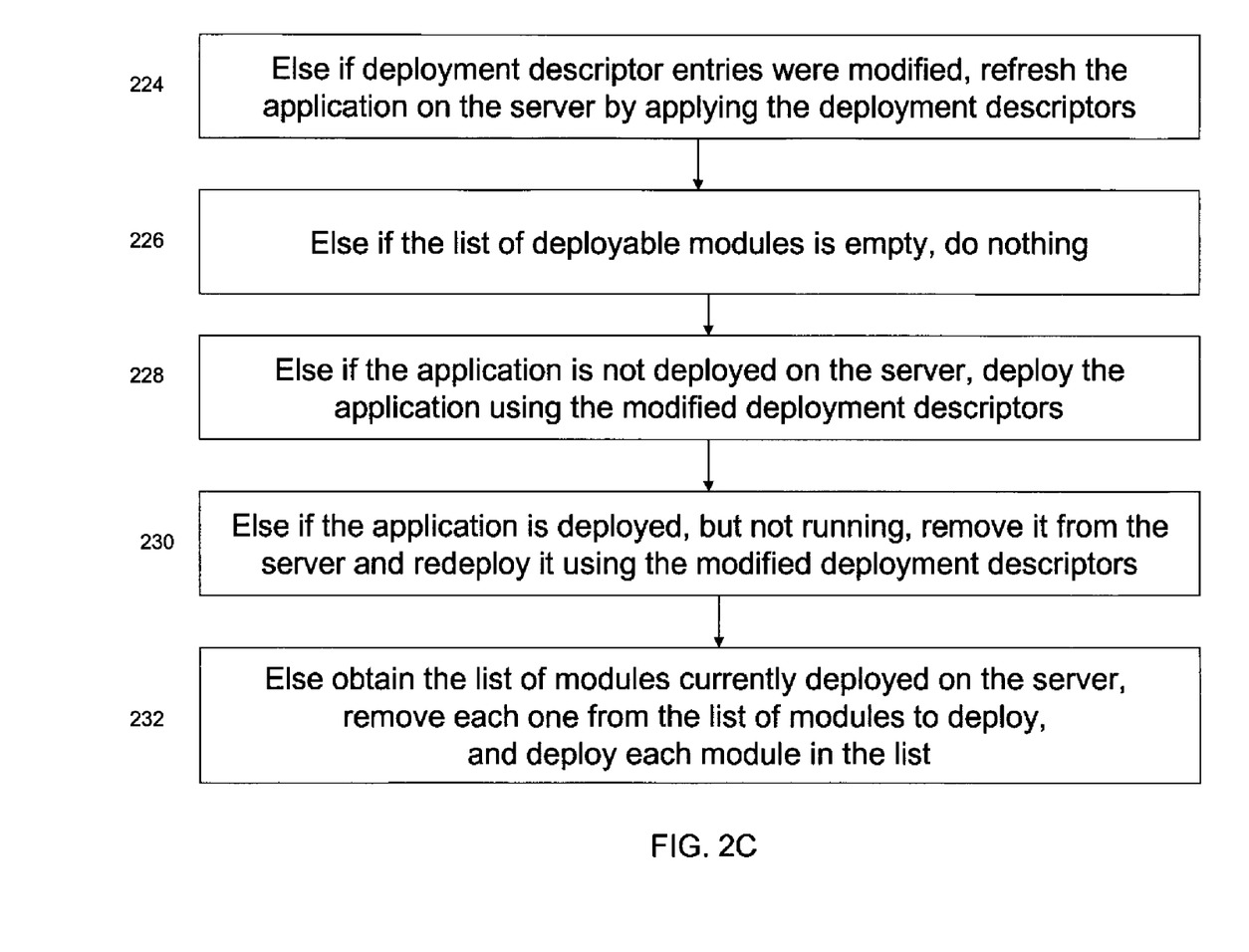

An incremental deployment process in accordance with one embodiment includes the following steps, shown in FIG. 2A, FIG. 2B, and FIG. 2C.

1. Construct a deployable modules list in an application 200. E.g., for J2EE applications, this includes Web Applications and Enterprise JavaBeans, wherein the deployable module list can contain at least one deployable module.

2. Examine at least one deployment descriptor for the application to determine if the at least one deployment descriptor contains an entry for each of the at least one deployable module 202.
3. If step (2) identified deployable modules without corresponding entries in the application's deployment descriptors, perform the following steps:
   a. Construct a list of modules to deploy containing each deployable module that was not found in the deployment descriptors in step (2).
   b. Add each module in the modules to deploy list to the application's deployment descriptors 204.
4. Examine the application's deployment descriptors to determine if they contain entries that are not in the list of deployable modules
5. If step (4) identified deployment descriptor entires not in deployable modules, perform the following steps:
   a. Remove each deployment descriptor entry identified in step (4) that is not in the list of deployable modules 206.
   b. Set ModulesRemoved=true
   c. If the deployment descriptors no longer contain any modules,
      i. set NoModulesLeft=true
6. For each module in the list of deployable modules, do the following:
   a. Construct a list of relevant attributes (e.g., security roles) for the current module e.g. from settings in the IDE
   b. If any of the attributes identified in (6a) are not included in the corresponding deployment descriptor entry for the current module, add them to the deployment descriptor entry 208 and set AttributesModified=true
   c. If any of the attributes identified in (6a) are included in the corresponding deployoment descriptor entry for the current module, but have a different value, change the value of the deployment descriptor entry to match that of the associated deployable module's value 212 and set AttributesModified=true.
7. For each module entry in the deployment descriptors, do the following:
   a. Construct a list of attributes (e.g., security roles) associated with the current module entry in the deployment descriptors
   b. If any of the attributes identified in (7a) are not included in the associated deployable module, remove them from the deployment descriptor 214 and set AttributesModified=true
8. If the server is not running
   a. If NoModulesLeft, delete the deployment descriptors 216
9. Otherwise if NoModulesLeft, remove the application from the server and delete the deployment descriptors 218.
10. Otherwise if ModulesRemoved, remove the application from the server and redeploy it using the modified deployment descriptors 220.
11. Otherwise if AttributesModified, refresh the application configuration on the server by rereading and applying the modified deployment descriptors 224.
12. Otherwise if the list of deployable modules is empty, do nothing 226
13. Otherwise, if the application is not deployed on the server, deploy it using the modified deployment descriptors 228.
14. Otherwise if the application is deployed, but not running, remove it from the server and redeploy it using the modified deployment descriptors 230.
15. Otherwise, do the following:
   a. Obtain the list of modules currently deployed on the server and remove each one from the list of modules to deploy
   b. Deploy each module in the list of modules to deploy individually 232

It can be noted that deployment descriptors may contain application configuration data added manually e.g. by an administrator. It can be important that these additions are preserved, even if the additions are not understood by the process. Therefore, this process may only modify portions of the deployment descriptors it understands. Other portions are preserved.

Example Deployment Descriptors

Examplary deployment descriptors that might be automatically created and updated by the iterative deployment process are shown below. These examples are taken from a J2EE environment and include application.xml and weblogic-application.xml. For example, the code below shows an example for application.xml.

```
<?xml version="1.0" encoding="UTF-8"?>
<!DOCTYPE application PUBLIC
  '-//Sun Microsystems, Inc.//DTD J2EE Application 1.3//EN'
  'http://java.sun.com/dtd/application_1_3.dtd'>
<application>
    <display-name>Medical Records Patient Application
    </display-name>
    <description>Medical Records Patient Application
    </description>
    <module>
        <web>
            <web-uri>adminWebApp</web-uri>
            <context-root>admin</context-root>
        </web>
    </module>
    <module>
        <web>
            <web-uri>mainWebApp</web-uri>
            <context-root>/</context-root>
        </web>
    </module>
    <module>
        <web>
            <web-uri>patientWebApp</web-uri>
            <context-root>patient</context-root>
        </web>
    </module>
    <module>
        <ejb>entityEjbs</ejb>
    </module>
    <module>
        <ejb>mailEjb</ejb>
    </module>
    <module>
        <ejb>registrationEjb</ejb>
    </module>
    <module>
        <ejb>sessionEjbs</ejb>
    </module>
    <module>
        <ejb>webServicesEjb</ejb>
    </module>
    <module>
        <web>
            <web-uri>ws_medrec</web-uri>
            <context-root>ws_medrec</context-root>
        </web>
    </module>
</application>
```

The code below shows and example for application.xml.

```
<!DOCTYPE application PUBLIC 'http://www.foo.com/servers/foo
/dtd/foo- application_2_0.dtd'>
  <application>
    <classloader-structure>
      <classloader-structure>
        <module-ref>
          <module-uri>SamplesApp</module-uri>
        </module-ref>
      </classloader-structure>
      <classloader-structure>
        <module-ref>
          <module-uri>WebApp</module-uri>
        </module-ref>
      </classloader-structure>
      <classloader-structure>
        <module-ref>
          <module-uri>WebServices</module-uri>
        </module-ref>
      </classloader-structure>
    </classloader-structure>
  </ application>
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An incremental deployment method for deploying modules on a server's disk, comprising the following steps:
   a. construct a deployable modules list in an application, wherein the deployable module list contains at least one deployable module;
   b. if there are deployable modules without corresponding entries in the application's deployment descriptors, create corresponding entries in the application's deployment descriptors for the deployable modules;
   c. if the application's deployment descriptors contain entries that are not in the list of deployable modules, remove each deployment descriptor entry that is not in the list of deployable modules;
   d. for each module in the list of deployable modules, if any attributes are not included in the corresponding deployment descriptor entry for the current module, add the attributes to the deployment descriptor entry, if any of the attributes are included in the corresponding deployment descriptor entry for the current module, but have a different value, change the value of the deployment descriptor entry to match that of the associated deployable module's value;
   e. for each module entry in the deployment descriptors, if any of the attributes are not included in the associated deployable module, remove them from the deployment descriptor;
   f. if the server is not running and if no modules are in the list of deployable modules, delete the deployment descriptors from the server's disk;
   g. else if no modules are in the list of deployable modules, remove the application from the server and delete the deployment descriptors from the server's disk;
   h. else if modules were removed from the list of deployable modules, remove the application from the server and redeploy the application onto the server's disk using the modified deployment descriptors;
   i. else if deployment descriptor entries were modified, refresh the application configuration on the server's disk by rereading and applying the modified deployment descriptors;
   j. else if the list of deployable modules is empty, do nothing;
   k. else if the application is not deployed on the server, deploy the application onto the server's disk using the modified deployment descriptors;
   l. else if the application is deployed, but not running, remove it from the server and redeploy the application onto the server's disk using the modified deployment descriptors;
   m. else obtain the list of modules currently deployed on the server, remove each one from the list of modules to deploy, and deploy each module in the list of modules onto the server's disk.

2. The method of claim 1, wherein the application of step (a) is a Java Enterprise Edition application.

3. The method of claim 1, wherein the list of deployable modules includes Web Applications and Enterprise JavaBeans.

4. The method of claim 1 wherein the incremental deployment method may only modify portions of the deployment descriptors that are generated automatically by the incremental deployment method while manual application configuration changes are preserved.

5. The method of claim 1 wherein the attributes of step (d) include security roles.

6. The method of claim 1 wherein the attributes, entries, and list of deployable modules are constructed from settings in an integrated development environment.

7. An incremental deployment system for deploying modules on a server's disk, the system implementing the following steps:
   a. construct a deployable modules list in an application, wherein the deployable module list contains at least one deployable module;
   b. if there are deployable modules without corresponding entries in the application's deployment descriptors, create corresponding entries in the application's deployment descriptors for the deployable modules;
   c. if the application's deployment descriptors contain entries that are not in the list of deployable modules, remove each deployment descriptor entry that is not in the list of deployable modules;
   d. for each module in the list of deployable modules, if any attributes are not included in the corresponding deployment descriptor entry for the current module, add the attributes to the deployment descriptor entry, if any of the attributes are included in the corresponding deployment descriptor entry for the current module, but have a different value, change the value of the deployment descriptor entry to match that of the associated deployable module's value;
   e. for each module entry in the deployment descriptors, if any of the attributes are not included in the associated deployable module, remove them from the deployment descriptor;

f. if the server is not running and if no modules are in the list of deployable modules, delete the deployment descriptors from the server's disk;

g. else if no modules are in the list of deployable modules, remove the application from the server and delete the deployment descriptors from the server's disk;

h. else if modules were removed from the list of deployable modules, remove the application from the server and redeploy the application onto the server's disk using the modified deployment descriptors;

i. else if deployment descriptor entries were modified, refresh the application configuration on the server's disk by rereading and applying the modified deployment descriptors;

j. else if the list of deployable modules is empty, do nothing;

k. else if the application is not deployed on the server, deploy the application onto the server's disk using the modified deployment descriptors;

l. else if the application is deployed, but not running, remove it from the server and redeploy the application onto the server's disk using the modified deployment descriptors;

m. else obtain the list of modules currently deployed on the server, remove each one from the list of modules to deploy, and deploy each module in the list of modules onto the server's disk.

8. The system of claim 7, wherein the application of step (a) is a Java Enterprise Edition application.

9. The system of claim 7, wherein the list of deployable modules includes Web Applications and Enterprise JavaBeans.

10. The system of claim 7 wherein the incremental deployment method may only modify portions of the deployment descriptors that are generated automatically by the incremental deployment method while manual application configuration changes are preserved.

11. The system of claim 7 wherein the attributes of step (d) include security roles.

12. The system of claim 7 wherein the attributes, entries, and list of deployable modules are constructed from settings in an integrated development environment.

* * * * *

UNITED STATES PATENT AND TRADEMARK OFFICE
CERTIFICATE OF CORRECTION

PATENT NO. : 7,296,255 B2
APPLICATION NO. : 10/785853
DATED : November 13, 2007
INVENTOR(S) : Garms et al.

It is certified that error appears in the above-identified patent and that said Letters Patent is hereby corrected as shown below:

In column 4, line 27, delete "effectly" and insert -- effectively --, therefor.

In column 5, line 15, after "modules" insert -- . --.

In column 5, line 24, after "true" insert -- . --.

In column 5, line 36, delete "deployoment" and insert -- deployment --, therefor.

In column 5, line 50, after "true" insert -- . --.

In column 5, line 53, after "216" insert -- . --.

In column 5, line 64, after "226" insert -- . --.

In column 6, line 9, after "232" insert -- . --.

In column 6, line 18, delete "Examplary" and insert -- Exemplary --, therefor.

Signed and Sealed this

Ninth Day of March, 2010

David J. Kappos
*Director of the United States Patent and Trademark Office*